E. F. & G. W. GOODYEAR.
J. FAULKNER, EXECUTOR AND ADMINISTRATOR OF G. W. GOODYEAR, DEC'D.
WHEEL, SUCH AS THE ROAD WHEEL OF AUTOMOBILES AND THE LIKE.
APPLICATION FILED JAN. 5, 1914.
1,183,295.                                           Patented May 16, 1916.
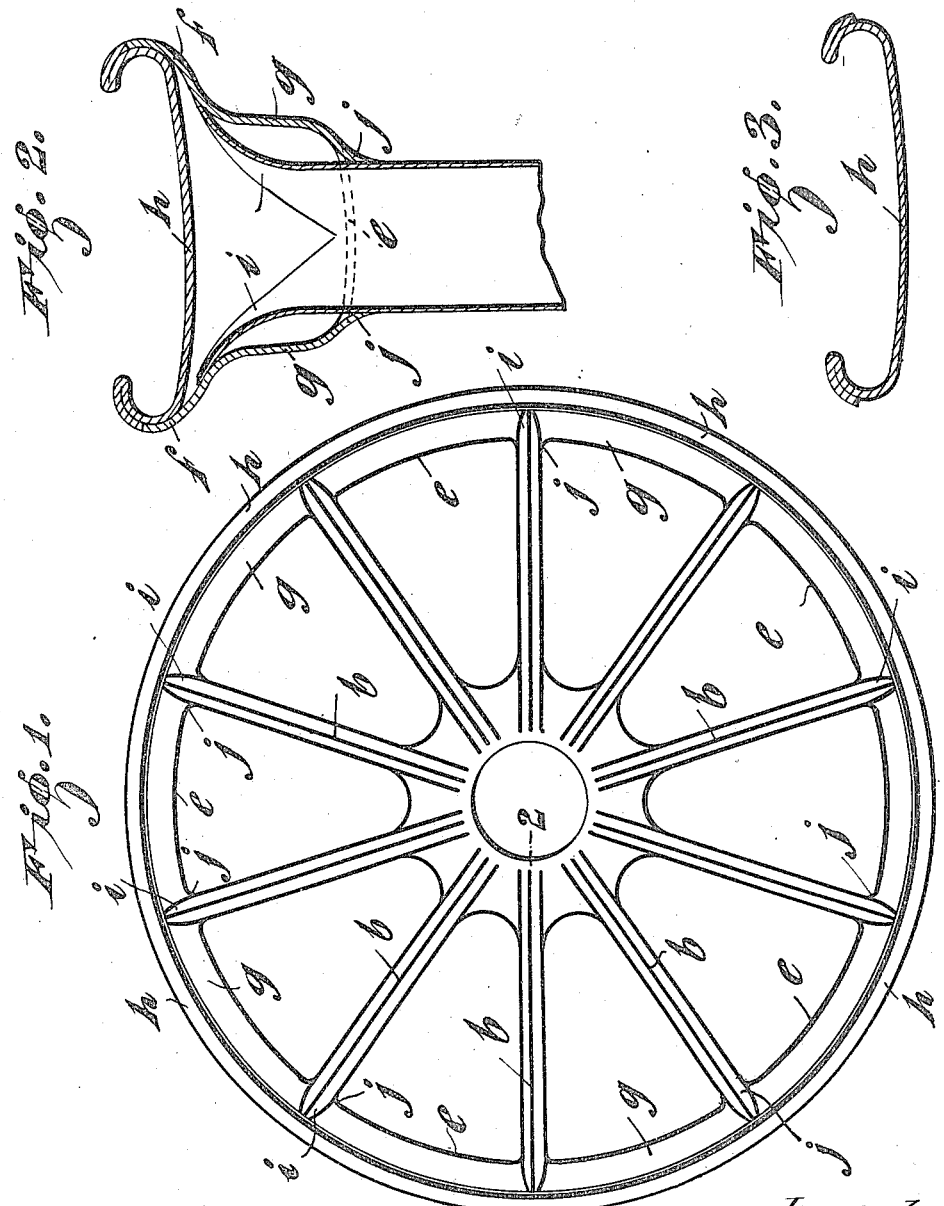

UNITED STATES PATENT OFFICE.

ERNEST FREDERICK GOODYEAR, OF DUDLEY, AND GEORGE WILLIAM GOODYEAR, DECEASED, LATE OF DUDLEY, ENGLAND, BY JOSEPH FAULKNER, EXECUTOR AND ADMINISTRATOR, OF DUDLEY, ENGLAND.

WHEEL, SUCH AS THE ROAD-WHEEL OF AUTOMOBILES AND THE LIKE.

1,183,295. Specification of Letters Patent. Patented May 16, 1916.

Original application filed November 17, 1911, Serial No. 660,905. Divided and this application filed January 5, 1914. Serial No. 810,441.

*To all whom it may concern:*

Be it known that we, ERNEST FREDERICK GOODYEAR and JOSEPH FAULKNER, subjects of the Kingdom of Great Britain, residing at Reliance Works, Dudley, in the county of Worcester, England, are, respectively, the joint applicant and the executor and administrator of GEORGE WILLIAM GOODYEAR, deceased, the other joint applicant in the United States application for Letters Patent, Serial No. 660,905, and that the said GEORGE WILLIAM GOODYEAR and ERNEST FREDERICK GOODYEAR have invented certain new and useful Improvements in or Relating to Wheels, such as the Road-Wheels of Automobiles and the like; and we hereby declare that the following is a full, clear, and exact description of the same, and that this application is a division of the application for Letters Patent of the United States for the same invention filed November 17, 1911, Serial No. 660,905.

This invention comprises certain improvements in or relating to wheels such as the road wheels of automobiles and the like, and more particularly to such of these wheels as are composed of steel or equivalent material, the object of the present invention being to provide a wheel which is stronger and generally of better and more satisfactory construction than those existing heretofore having regard both to utility and cost in manufacture.

According to this invention a main rim or felly is provided and secured directly or indirectly to the outermost extremities of the spokes. The said main rim or felly is adapted to form a channel for the reception of a standard section rim adapted to receive and retain the pneumatic tire; said standard section rim is split at one point in its circumference so that it can be expanded and placed in position within the main rim, after which upon the standard section rim having contracted to its normal diameter it is welded, brazed or otherwise secured to the main rim in such a manner that the standard section rim is thereby locked and effectively precluded from movement or separation.

In order that this invention may be clearly understood and more readily carried into practice, reference may be had to the appended explanatory sheet of drawings, upon which:—

Figure 1 is an elevation of a wheel suitable as the road wheel of an automobile and constructed in accordance with the present invention. Fig. 2 is an enlarged transverse section of Fig. 1. Fig. 3 is a section showing separately the rim indicated by reference *h* shown in Fig. 2.

In the drawings *e* is the main rim or felly adapted externally to resemble the felly of a wooden wheel and to which rim *e* of channel section the spokes are secured; the said rim of channel section has at the outermost edges of its two flanges, lips or rings *f* diverging away from each other as shown in Fig. 2 or at an angle of about 45° to the flanges *g* upon which they are formed. In between the inclined lips *f* is disposed a standard section rim *h* adapted to receive and carry a pneumatic tire. Said standard section pneumatic tire rim is conveniently of the form shown in Fig. 3 and is split or divided at one point in its circumference to permit of its being sprung over one of the lips *f* upon the channel rim *e*; after being placed in position its joint is welded, brazed or otherwise secured, in addition to which the rim may be jointed at each side to the inclined lips *f* throughout the entire circumference of the wheel, the lips forming a lock by which the standard section pneumatic tire rim cannot be displaced after it has been jointed and fixed in its contracted condition.

At the outermost extremities of the spokes at which they are secured to the channel rim, conveniently before the pneumatic tire rim is secured thereon, each spoke is divided in the form of two tongues *i* which are projected through a hole in the channel rim after which the tongues are secured to the side flanges *g* of the channel rim at their inner surface. The whole is brazed, welded or otherwise suitably secured and if desired the tongues *i* may be riveted to the side flanges *g* of the channel rim *e*. The holes in the base of the channel rim *e* through which the tongues project, may in the process of formation be surrounded with metal *j* which is curved inwardly in a direction toward the center of the wheel and which metal forms a collar surrounding the tube spoke by which the latter may be more effectively secured, welded or brazed in connection with the rim e. The tongues i may be tapered or pointed or they may be square at their outermost extremities formed by dividing the tube for a short distance and opening out the halves. As an alternative to this arrangement however a boss may be provided upon the base of the channel rim, within the latter, said boss being adapted to receive the end of the tube which latter is secured by welding, brazing or the like within the boss, the boss being in similar manner secured or welded within the channel and if desired being furnished with lugs, extensions or the like by which it is riveted to more effectively retain it in position within the rim. Or a similar boss may be provided upon the face of the channel rim nearest the center of the wheel to receive the extremity of the tube spoke and secure the latter to the rim. Or a male boss may be provided upon the surface of the channel base nearest the center of the wheel, said male boss being adapted to project into the extremity of the tube spoke thereby retaining the latter in the desired connection.

In the drawings we have illustrated the spokes having an internal web h disposed transversely of the plane of the wheel and by which the spokes are materially strengthened. Such construction of the spokes is more particularly described and claimed in the specification of our concurrent United States application, Serial Number 660,905, but we wish it to be understood that our present invention is not confined to the construction of spokes illustrated or to the manner of securing said spokes to the main rim. The spokes may be secured to any suitable form of hub or center in any convenient manner.

What we claim as our invention and desire to secure by Letters Patent is:—

1. A wheel for automobiles and the like comprising in combination, a channel rim and a tire rim secured within said channel rim, said tire rim having inwardly projecting edges for engaging the beads of a tire, and the metal of the edges extending outwardly and downwardly to such an extent as to form a joint with the outer edges of the channel rim.

2. A wheel for vehicles comprising in combination, a channel rim and a tire rim secured within said channel rim, said tire rim having its metal arranged in double thickness along its edges and the outer layer forming a butt joint with said channel rim.

In witness whereof we have hereunto set our hands in the presence of two witnesses.

ERNEST FREDERICK GOODYEAR.
JOSEPH FAULKNER,
*Executor and administrator of George William Goodyear.*

Witnesses:
ARTHUR H. BROWN,
HOLLIS F. BROWN.